Figure 1:
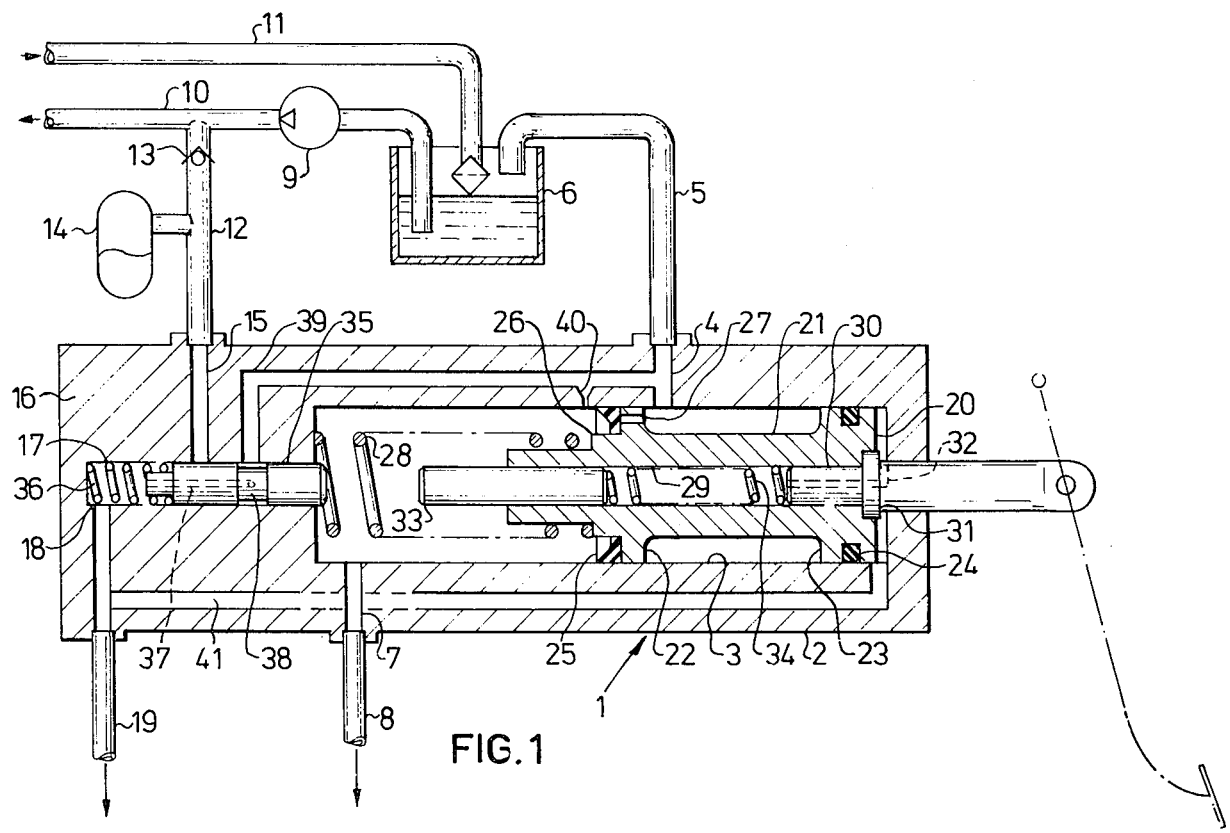

United States Patent [19]
Schlicker

[11] 4,027,922
[45] June 7, 1977

[54] HYDRAULIC SERVO-BRAKE ARRANGEMENT FOR DOUBLE CIRCUIT BRAKES

[75] Inventor: Heinrich August Schlicker, Stenungsund, Sweden

[73] Assignee: AB Volvo Penta, Goteborg, Sweden

[22] Filed: Mar. 12, 1976

[21] Appl. No.: 666,332

[30] Foreign Application Priority Data

Mar. 13, 1975 Sweden .............................. 7502824

[52] U.S. Cl. .................................. 303/6 R; 303/52
[51] Int. Cl.[2] ................. B60T 60/548; B60T 13/28
[58] Field of Search ............ 60/546, 553, 548, 557, 60/558; 137/627.5; 188/345; 303/6 C, 6 R, 10, 52, 54

[56] References Cited
UNITED STATES PATENTS

| | | | |
|---|---|---|---|
| 3,684,330 | 8/1972 | Kito | 303/54 |
| 3,692,367 | 9/1972 | Kuromitsu | 303/52 |
| 3,891,278 | 6/1975 | Grosseau | 303/6 R X |

*Primary Examiner*—Duane A. Reger
*Attorney, Agent, or Firm*—Young & Thompson

[57] ABSTRACT

A hydraulic servo-brake arrangement for a vehicle brake system having two brake circuits comprises a piston-cylinder arrangement with a piston rod for connection to the vehicle brake pedal and with a cylinder inlet from a fluid reservoir and a cylinder outlet to a first brake circuit, and a regulator valve with an inlet from a pressure source and an outlet to a second brake circuit. The pressure in the first brake circuit influences the regulator valve to open the connection between the pressure source and the second circuit, while the pressure in the second circuit urges the piston in the braking direction. The piston is mounted for limited displacement in relation to the piston rod, whereby valve control means are movably mounted together with the piston rod to urge the control valve in the opening direction after a predetermined piston rod travel in the braking direction.

7 Claims, 2 Drawing Figures

U.S. Patent June 7, 1977 4,027,922

HYDRAULIC SERVO-BRAKE ARRANGEMENT FOR DOUBLE CIRCUIT BRAKES

The present invention relates to a hydraulic servo-brake arrangement for a vehicle brake system having two brake circuits comprising a piston cylinder arrangement with a piston rod for connection to the vehicle brake pedal and with a cylinder inlet from a fluid reservoir and a cylinder outlet to a first brake circuit and a regulator valve with an inlet from a pressure source and an outlet to a second brake circuit.

In servo-brake arrangements of this type it is known to adapt the piston rod (operating rod) in such a way that the rod acts directly on the piston so that the travel of the piston and the rod are always the same. An advantage with this arrangement is that the driver always senses the condition in the brake cylinder, e.g., feels a certain "resiliency" in the pedal when there is air in the brake system. A disadvantage resulting from this, however, is that the braking force is poor on loss of pressure in the second circuit (the servo circuit) and the pedal travel is thus the same as when the system is intact. An additional disadvantage is that a pressure loss in the first circuit entails that braking pressure is first obtained in the second circuit when the piston has reached its end position, i.e., the brake pedal has bottomed.

Servo-brake arrangements have been constructed to avoid the above-mentioned disadvantages. When the system is intact these use only a part of the available pedal travel, but with a loss of pressure use the entire pedal travel. In this way a smaller brake cylinder can be used which, together with the extension of the operating travel, allows greater braking force with a loss of servo pressure than in the first-described arrangement. In the known arrangements having an extension of the operating travel of the piston rod, however, there is no rigid mechanical connection between the piston and piston rod but rather the pedal resistance is achieved by means of, for example, springs. The piston rod acts on a valve slide and the pressure corresponding to the spring resistance urges the piston in the direction of braking. A disadvantage of this construction is that the lack of a rigid connection between the piston rod and piston means that the condition in the first circuit is no longer felt in the pedal. The condition in the first circuit can be such that the piston almost bottoms with normal braking, something that is first noticed upon hard braking through insufficient braking force in the first circuit. Even more serious, however, is a breakdown in the servo-brake circuit under these conditions.

The purpose of the present invention is to achieve a servo-brake arrangement of the type disclosed in the introduction which combines the advantages of the known arrangements while eliminating their disadvantages, i.e., allows an extension of the operating travel of the piston rod on servo pressure loss, and at the same time always provides a check of the condition in the first circuit.

This is accomplished according to the invention in that the pressure in the first brake circuit urges the regulator valve to open the communication between the pressure source and the second circuit, while the pressure in the second circuit urges the piston in the braking direction, and in that the piston is mounted for limited displacement in relation to the piston rod, whereby valve control means are movably mounted together with the piston rod to urge the control valve in the opening direction after a predetermined piston rod travel in the braking direction.

With this construction for the normal condition in the two circuits the piston and piston rod are movable together during a first portion of the maximum operating travel until the valve control means opens the control valve, whereafter the pressure in the second circuit (the servo circuit), which acts on the back side of the piston, displaces the piston relative to the piston rod, so that the travel of the piston rod is considerably shorter than the travel of the piston for the remaining portion of the maximum operating travel. On loss of servo pressure, the piston is displaced the entire operating travel by the piston rod which can then be displaced a longer travel than that which is required when the servo circuit is intact. If the first brake circuit contains much air, this is clearly felt because the pedal falls until the piston rod has moved so far that the valve control means opens the control valve, whereby a noticeable servo effect is obtained.

Figure 2:
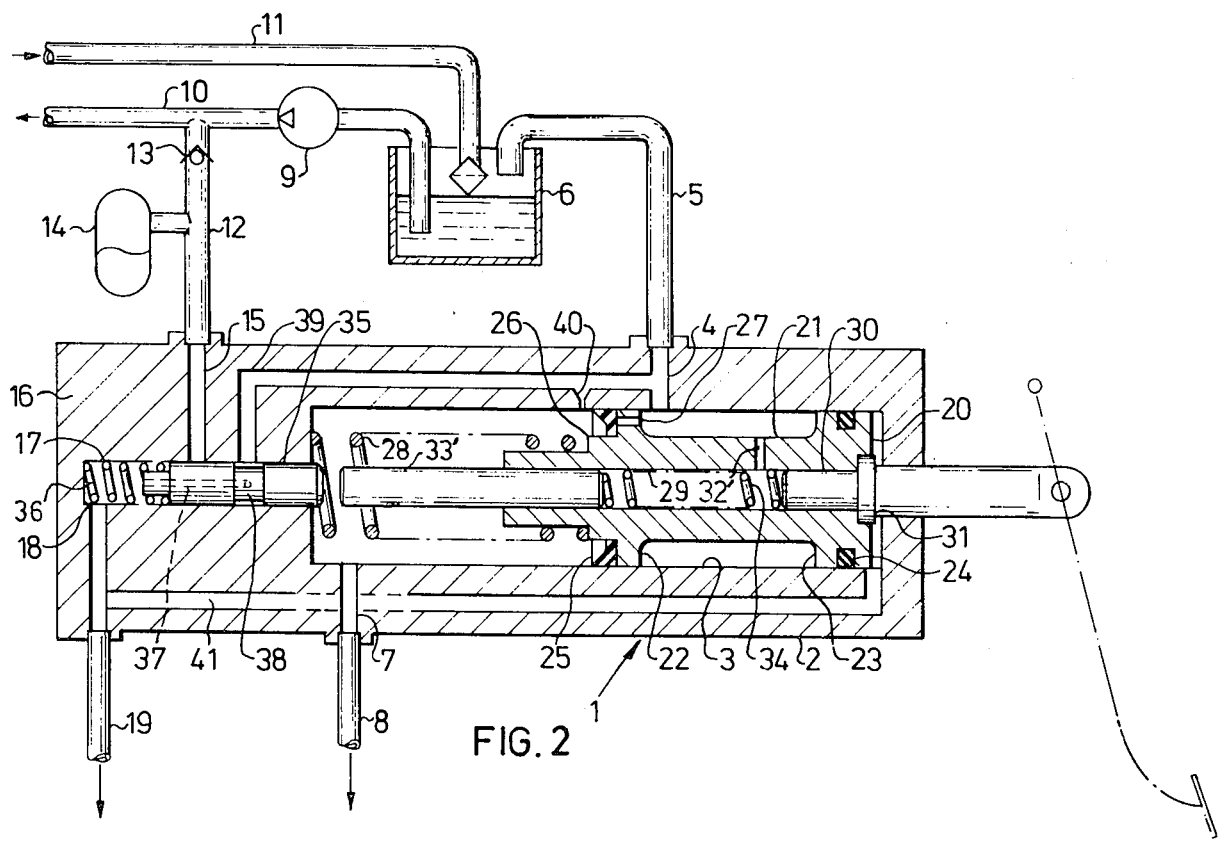

The invention is described in detail with reference to the examples of embodiments shown in the attached drawing, where FIG. 1 shows a longitudinal section through a schematically presented first embodiment of the device according to the invention with connections, and FIG. 2 shows a similar section through a second embodiment.

The servo-brake arrangement designated 1 in the figures has a hydraulic cylinder 2 whose cylinder bore 3 via a connecting channel 4 communicates with a line 5 which leads to a tank 6 with a pressure medium such as oil. A second channel 7 is connected to a line 8 which leads to a first brake circuit. From the tank 6 a pump 9 feeds the medium to a line 10 which, for example, leads to a servo control means which has a return line 11 to the tank. A branch line 12 having a non-return valve 13 and a pressure accumulator 14 is connected to an inlet channel 15 in a valve housing 16 which is integrally formed with the hydraulic cylinder 2 and which has a valve drilling 17 from which issues a channel 18 to which a line 19 is connected. The line 19 leads to a second brake circuit.

A piston 20 is displaceably mounted in the cylinder bore 3 of the cylinder 2. In a conventional way the piston has a middle section 21 with reduced diameter and forward and rear sections 22 and 23 which slidingly bear on the wall of the cylinder bore 3. The rear section has a groove with an O-ring 24. Ahead of the forward section 22 a piston packing 25 is provided on a shoulder 26. The packing 25 closes a drilling 27 in the section 22. A return spring 28 between the left end wall of the cylinder bore 3 and the end surface of the shoulder 26 holds the piston 20 in its right-hand inactive end position when the brake is not activated by means of the brake pedal, indicated with a broken line.

The piston 20 has a central through-drilling 29 into whose right end a piston rod 30 is slidably inserted. The piston rod is formed with an annular flange 31 which, in the position shown in the figure, engages the back side of the piston 20 in a corresponding recess. A drilling 32 extends through the rod 30 and connects the cylinder space on the back side of the piston with the piston drilling 29. In the forward end of the drilling 29 a push rod 33 is slidably carried, which bears on one end of a compression spring 34 whose opposite end bears on the end surface of the piston rod.

The push rod 33 is axially aligned with a valve slide 35 which is displaceably mounted in the drilling 17 of the valve housing 16, which valve slide is located by a spring 36 towards the cylinder space on the front side of the piston 20. The valve slide 35 is furnished with a drilling 37 which leads from its end facing the spring 36 to a section 38 having reduced diameter. In the figures the slide 35 is shown in a position in which it closes the channel 15. The section 38 then lies just opposite a channel 39 which connects the valve drilling 17 with the channel 4 to the tank line 5. The channel 39 forms the return channel of the servo circuit 19 and has an equalizing channel 40 to the cylinder bore 3. From the valve channel 18 leading to the brake circuit 19 a channel 41 branches to the cylinder bore 3 on the back side of the piston 20.

The function of the arrangement is as follows:

When the brake pedal is depressed a bit, the piston rod 30 is displaced to the left and through the action of the flange 31 drives the piston 20 so that the pressure in the cylinder space on the front side of the piston increases. When the pressure becomes so great that the force on the right end of the valve slide 35 overcomes the force from the return spring 36, the slide is displaced to the left and establishes communication between the channels 15 and 18, whereby the pressure in the brake circuit 19 increases. This pressure is propagated via the channel 41 to the cylinder space on the back side of the piston 20, so that the piston is urged to the left by a force. When the pressure in the circuit 19, which acts on the left-hand end surface of the valve slide, together with the force of the spring 36 overcomes the force exerted by the pressure in the cylinder space on the front side of the piston on the valve slide 35, the valve slide 35 closes towards the channel 15. During this first portion of the braking movement the piston and piston rod move as a unit and the force from the return spring 28 and the piston sealing friction are wholly borne by the piston rod. The difference in pressure in the two brake circuits is determined solely by the spring force in the valve slide return spring 36. In a practical embodiment a return spring is chosen which gives a differential pressure of about 0.8 bar. This implies a substantial advantage compared with known double circuit servo brake arrangements whose spring arrangements achieve differential pressures in the order of 10 bar, which entails that on slippery roads braking occurs with only one brake circuit.

The piston 20 and the piston rod 30 move as a unit until the push rod 33 strikes the valve slide 35 and displaces it to the left to the open position. At this point a pressure can be built up in the cylinder bore 3 on the back side of the piston which is capable of displacing the piston forwards in relation to the piston rod. On hard braking the travel of the piston 20 will accordingly be longer than that of the piston rod 30.

If the first brake circuit should fail, e.g., through the arisal of a leak, brake pressure is obtained in the second circuit as soon as the piston rod has been displaced so far that the push rod 33 has displaced the valve slide 35 to the open position. In the embodiment shown in the figures, the part of the piston rod 30 projecting into the piston drilling 29 and the push rod 33 and the valve slide 35 have the same cross sectional area. The push rod 33 and the valve slide 35 are therefore exposed to equally large, but opposite forces through the pressure in the second circuit, whereby the piston rod is influenced by a corresponding restoring force. In order to reduce this restoring force, which attempts to "return" the brake pedal when the valve opens, the piston rod 30 and the push rod 33 can be formed with smaller cross sectional areas than the valve slide 35. This will simultaneously entail that the piston rod travel will be proportional to the pressure in the second circuit because increased pressure is achieved through compression of the spring 34 with the aid of the piston rod 30.

With a loss of pressure in the second circuit, e.g., because of a failure in the pump 9 or the pressure accumulator 14, the piston 20 can, with the help of the piston rod 30, be displaced beyond the point to which the piston is normally displaced relative to the piston rod under the influence of the pressure in the second circuit. The push rod 33 is hereby projected into the piston drilling 29 by the valve slide 35 so as not to hinder the movement of the piston. With a loss of pressure in the second circuit, a longer piston rod travel and thereby pedal travel can accordingly be utilized that when the second circuit is intact, and this is achieved without losing the capability of checking the condition in the first circuit.

A modified embodiment of the servo-brake arrangement according to the present invention is shown in FIG. 2. The construction of said embodiment differs from the above-described embodiment in that a longer push rod 33' is used so that, in the practical embodiment, its outer end is situated at a distance of approx. 4 mm from the slide 35 in the position shown in the figure, and in that a drilling 32' in the piston 20 replaces the drilling in the piston rod. The drilling 32' connects the piston drilling 29 with the tank 6.

The pressure in the drilling 29 in this embodiment is less than the pressure in the cylinder space on the front side of the piston 20 when the normal state prevails in both of the circuits and the piston is moved to the left. The push rod 33' will not follow the piston 20 and the piston rod 30 in a synchronized manner. Rather, said piston and piston rod will be moved to the left in relation to the push rod 33'. The relative movement between the piston and the push rod is determined by the difference between the force acting upon the outer end of the push rod as a result of the pressure in the cylinder space and the force from the spring 34 which acts upon the inner end of the push rod. By means of selecting spring 34, it is possible to determine the operating travel of the piston rod 30 in the braking direction before the valve slide 35 is affected in the opening direction by the push rod 33' when a pressure is built up on the back side of the piston, said pressure being capable of moving the piston forwards in relation to the piston rod.

The spring 34 can, for example, be dimensioned so that the push rod 33' normally does not reach the valve slide 35 until some air is present in the first circuit and in the event of circuit breakage and total loss of pressure. In the latter case, the push rod opens the regulator valve after a very short operating travel so that a very slight pedal fall is obtained.

Instead of achieving different oppositely-directed forces on the push rod 33' by means of obtaining a lower hydraulic pressure in the drilling 29 than in the cylinder space, as is the case in the shown embodiment, it is also possible to achieve the same pressure on both of these places. The push rod can be constructed so as to have a greater cross section area at its outer end than at the end in the drilling 29. The selection of the spring will, even in this case, be decisive as regards how far the push rod is pushed into the drilling during increasing static pressure in the first circuit.

In order to use a smaller spring for practical reasons, it can be suitable to, in contrast to the shown embodiment, construct the push rod so that it has a cross section area which is smaller than the cross section area of the valve slide.

The invention is, of course, not limited to the embodiments shown and described having a piston-cylinder arrangement and pressure regulation valve combined in one unit. These may, within the scope of the invention, be separate units, whereby the valve-controlled means which is movable together with the piston rod need not be a push rod carried in a piston drilling, but can instead be formed by another suitable means which influences the valve after a predetermined movement of the piston rod.

What I claim is:

1. A hydraulic servo-brake arrangement for a vehicle brake system having two brake circuits, comprising a cylinder having an inlet connected to a fluid reservoir and an outlet connected to a first said brake circuit, a piston movably mounted in said cylinder and having a piston rod for connection to the vehicle brake pedal, a valve housing having an inlet connected to a pressure source and an outlet connected to the second said brake circuit, a valve body movably mounted in said valve housing, said valve housing communicating with the first brake circuit such that the pressure in the first circuit forces the valve body in a direction to open the connection between said pressure source and the second brake circuit, said second brake circuit communicating with said cylinder such that the pressure in the second brake circuit forces the piston in a direction to increase the pressure in the first brake circuit, the piston being mounted for limited displacement in relation to the piston rod, and means for mechanically displacing the valve body in the opening direction after a predetermined piston rod travel in the braking direction.

2. An arrangment according to claim 1, wherein the valve housing has a drilling which has an open end in communication with the cylinder space on the front side of the piston, the valve body is a valve slide which is displaceably mounted in said drilling and the means for mechanically displacing the valve body is a push rod, which is movable together with the piston rod and coaxial with the valve slide, whereby the valve slide is displaceable by the push rod after a predetermined travel of the piston rod in the braking direction.

3. An arrangement according to claim 2, wherein the piston has a central through-drilling into whose one end is inserted the piston rod and into whose opposite end is inserted the push rod, and a compression spring in the through-drilling whose opposite ends bear against the piston rod and against the push rod.

4. An arrangement according to claim 3, wherein the valve slide and the push rod have substantially the same cross-sectional area.

5. An arrangement according to claim 2, wherein the valve slide is loaded in the closing direction toward the piston by a return spring whose spring force is such that the pressure differential between the first and second brake circuits is about 0.8 bar.

6. An arrangement according to claim 4, wherein the ratio between the cross-sectional areas of the outer and inner ends of the push rod and the ratio between the fluid pressures acting on said areas are such that, in the normal state in the first brake circuit, initial movement of the piston in the braking direction results in the push rod being influenced by a force in said direction, said force being less than the force acting in the opposite direction on the push rod.

7. An arrangement according to claim 6, wherein said outer and inner ends of the push rod have the same cross-sectional area and a fluid communication is provided between the drilling in the piston and a return channel to the fluid reservoir.

* * * * *